June 2, 1931.  L. L. KOLE  1,808,357

COVER LIFTER FOR ROASTERS

Filed Sept. 7, 1929  2 Sheets-Sheet 1

Inventor:
Lessing L. Kole
by Lester L. Sargent
Atty.

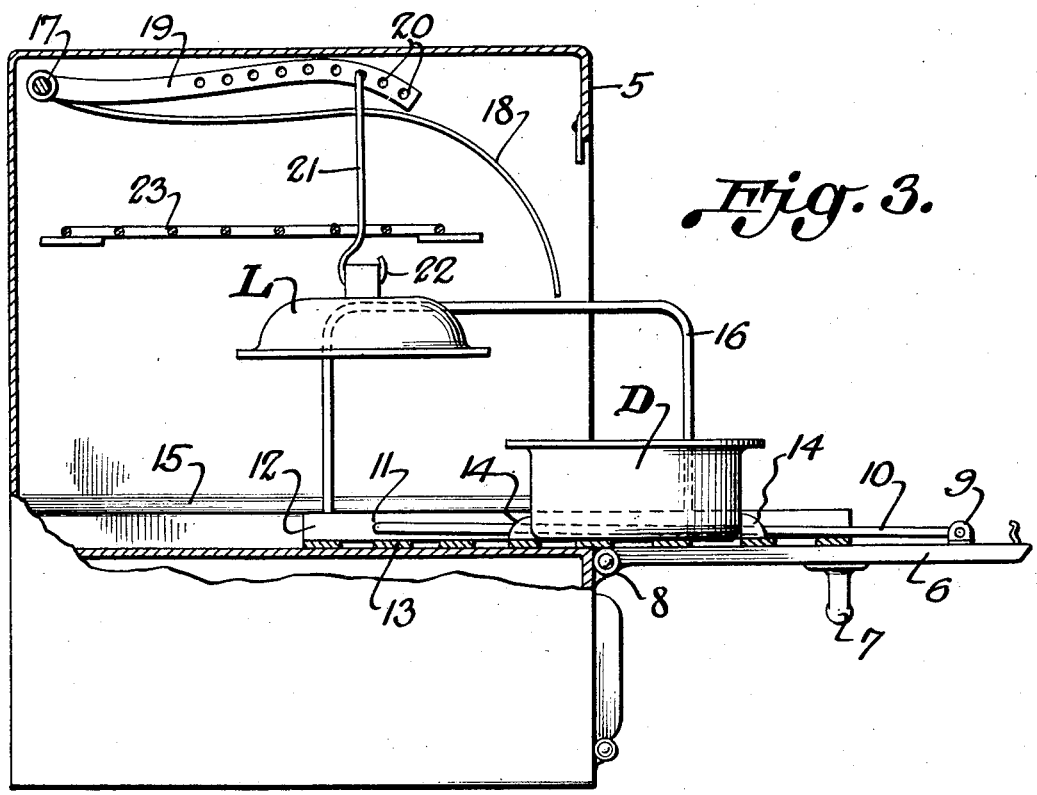
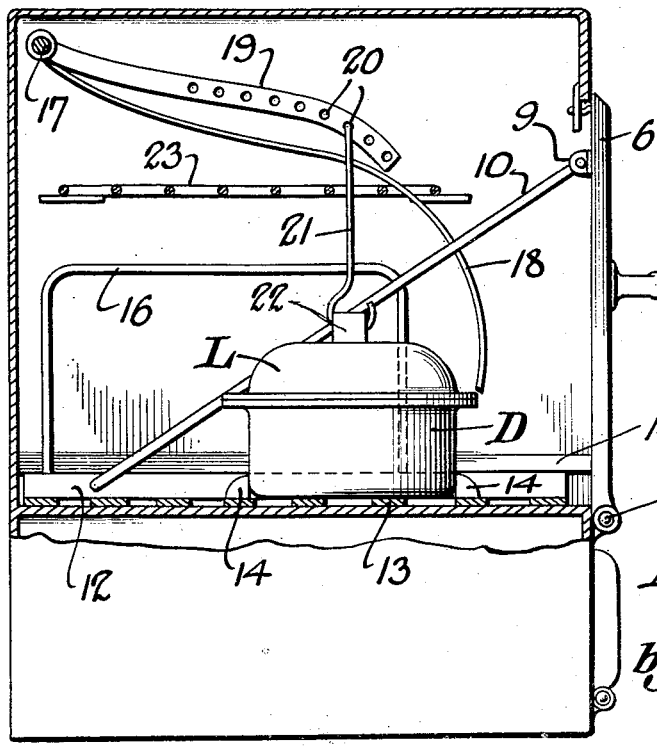

Patented June 2, 1931

1,808,357

UNITED STATES PATENT OFFICE

LESSING L. KOLE, OF MILWAUKEE, WISCONSIN

COVER LIFTER FOR ROASTERS

Application filed September 7, 1929. Serial No. 391,000.

The object of my invention is to provide a novel cover lifter for a roasting pan and also to devise novel means for automatically swinging the pan into a forward easily accessible position and at the same time lifting the cover when the door of the oven is opened.

I attain these and other objects of my invention by the apparatus illustrated in the accompanying drawings, in which,—

Fig. 3 is a vertical section through the oven with the oven door open and the cover of the roaster raised; and Fig. 4 is a similar view with the oven door closed and the roaster lid or cover in place.

Like numerals designate like parts in each of the several views.

Figure 1:
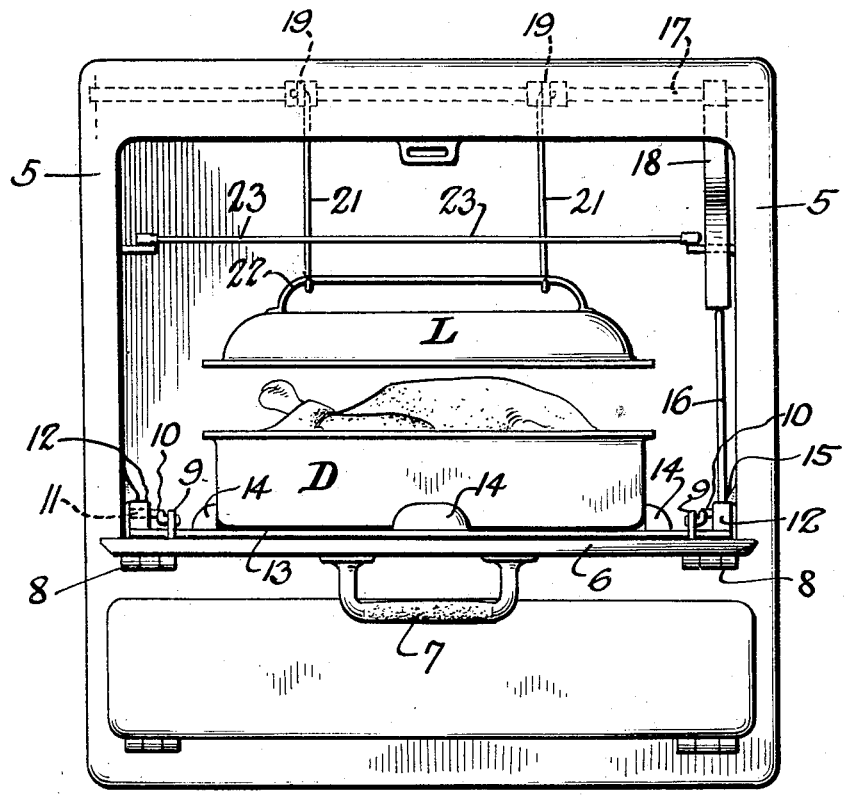
Figure 1 is a front elevation of my invention.

Referring to the accompanying drawings, there is illustrated an oven 5 having the conventional door 6 hinged at 8 to swing outward and forward to a nearly horizontal position, the door being provided with the usual handle 7. On the inside of the oven door I provide suitable brackets 9 near opposite edges of the door to which brackets are attached rods 10 which have their upper ends engaging the brackets 9 and their lower ends, which are approximately L-shaped, engaging the rods 12 on each side of the oven grate or grid 13. I also provide a plurality, preferably four, of stops or guides 14 to engage the bottom of the roasting pan D and hold it in place on the grid or grate 13.

Figure 2:
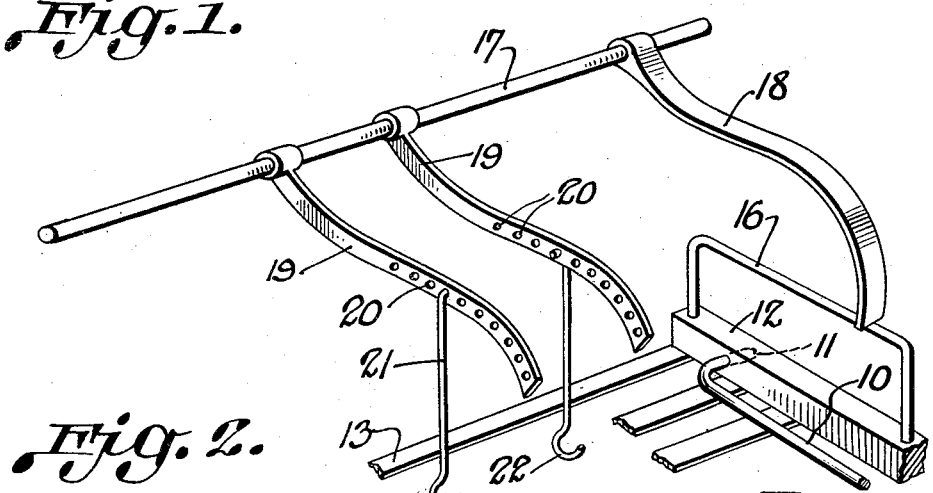
Fig. 2 is a detail perspective view of the cover lifting mechanism.

I provide suitable ribs or flanges 15 having the bottom edges of same contacting with the upper surface of the ribs 12. The roasting pan D is provided with a conventional lid or cover which has the usual handle 22. I provide a pair of hooks 21 (or chains which are the equivalent of these hooks may be provided). The hooks 21 are adjustably attached to one of the apertures 20 in the curved bars 19 which are affixed to the rod 17, as shown in Fig. 2, and which rod also carries a curved bar 18.

I also provide an elongated ⊓-shaped rod 16 mounted in one of the members 12, the bar 18 being arranged to contact with and be operated by the rod 16. I provide the conventional middle grate 23 which can be used for other food without conflicting with the use of the roasting pan.

In operation, when the door 6 is opened in the usual manner, the rods 10 attached to brackets 9 carried by the oven door 6 pull the ribs 12 and the grate forwardly onto the open horizontal door, thus bringing the roasting pan into a convenient and easily accessible position, as shown in Fig. 3. As the oven door is opened the rod 16 which contacts with the bar 18 causes that member to move upwardly and thus slightly rotate the rod 17 and simultaneously raise the bars 19 and rods (or chains) 21, thereby lifting the cover or lid L from the roasting pan D. The reverse operation occurs when the oven door is swung to a closed position.

The operation of the invention thus described eliminates the necessity for reaching in to pull out the roasting pan and thus eliminates the danger of burning one's hands. At the same time the roaster pan can be readily taken out for cleaning.

It is also within the contemplation of my invention to omit the cleats 14 or to arrange them in any suitable or desired manner for holding the roasting pan of any desired shape or size.

It is within my contemplation to detach the movable grid which will prevent the sliding grid from coming out if it is not wanted.

What I claim is:

1. In apparatus of the class described, the combination with a hinged oven door of a slidable grate having means for releasably holding a roasting pan in a pre-determined place on the grate, means operatively connecting the grate with the upper portion of the oven door to cause the grate to move forward onto the oven door when the latter is swung to a nearly horizontal position, a rod having a fixed relation to the grate and moving with same, said rod extending upwardly and rearwardly, a rod rotatably mounted to the rear portion of the oven, said rod having a bar aligned with the rod that moves with the grate and adapted to be operated by same when the grate is moved outwardly onto the oven door, and bars connected to said rod, and means connecting the cover of the roasting pan with said bars whereby when the oven door is open and the grate carrying the roasting pan is moved outward the cover of the roasting pan will be lifted.

2. In an apparatus of the class described, the combination with an oven having a slidable grate, means operatively connecting the slidable grate with the oven door, means for releasably holding the roasting pan in a pre-determined position on the slidable grate, a cover for the roasting pan, means for raising and lowering said cover, means mediately connected with the slidable grate for actuating the means that lift the roasting pan cover from the roaster when the oven door is opened.

3. In an apparatus of the class described, the combination of means for releasably holding a roasting pan in a pre-determined position within the oven, means for moving the roasting pan to an accessible position outside the oven, and means within the oven for elevating the lid of the roasting pan and operatively connected means for supporting the roasting pan when the latter is moved to an exposed position outside the oven.

4. In combination with an oven having a hinged door, a slidable grate for carrying a roasting pan, bars attached to the sides of the slidable grate, rods operatively connecting said bars with the upper portion of the oven door whereby the slidable grate will be moved outwardly when the oven door is opened, an ⊓-shaped rod mounted on one of the aforesaid bars, a curved bar in position to contact with said ⊓-shaped rod when the latter moves forwardly as the oven door is opened, a rod to which said curved bar is affixed, and means connected with said rod and with the lid of the roasting pan for raising the lid when the oven door is opened and the roasting pan moved to an outward and easily accessible position.

5. In combination with an oven having a hinged door, a slidable grate for carrying a roasting pan, bars attached to the sides of the slidable grate, rods operatively connecting said bars with the upper portion of the oven door whereby the slidable grate will be moved outwardly when the oven door is opened, an ⊓-shaped rod mounted on one of the aforesaid bars, a curved bar in position to contact with said ⊓-shaped rod when the latter moves forwardly as the oven door is opened, a rod to which said curved bar is affixed, forwardly extending bars connected with said rod, and depending members adjustably connected with said bars and with the lid of the roasting pan for raising said lid when the oven door is opened.

LESSING L. KOLE.